(12) United States Patent
Raghunath et al.

(10) Patent No.: US 7,471,060 B2
(45) Date of Patent: Dec. 30, 2008

(54) RECHARGEABLE ELECTRONIC DEVICE SYSTEM AND METHOD FOR RECHARGING AN ELECTRONIC DEVICE

(75) Inventors: Mandayam Thondanur Raghunath, Fishkill, NY (US); Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/668,626

(22) Filed: Sep. 23, 2003

(65) Prior Publication Data

US 2005/0062454 A1  Mar. 24, 2005

(51) Int. Cl.
*H01M 10/46* (2006.01)
(52) U.S. Cl. ..................................... 320/107
(58) Field of Classification Search ................. 320/101, 320/114, 115, 107, 108, 109; 136/291, 293
See application file for complete search history.

(56) References Cited

U.S. PATENT DOCUMENTS

| | | | | | |
|---|---|---|---|---|---|
| 3,631,360 | A | * | 12/1971 | Lehovec | ..................... 250/552 |
| 3,704,377 | A | * | 11/1972 | Lehovec | ................... 372/43.01 |
| 3,781,647 | A | * | 12/1973 | Glaser | ......................... 136/245 |
| 5,973,259 | A | * | 10/1999 | Edelson | ..................... 136/254 |
| 6,114,834 | A | * | 9/2000 | Parise | ......................... 320/109 |
| 6,265,100 | B1 | | 7/2001 | Saaski et al. | |
| 6,534,705 | B2 | | 3/2003 | Berrios et al. | |
| 6,556,222 | B1 | | 4/2003 | Narayanaswami | |
| 6,792,259 | B1 | * | 9/2004 | Parise | ......................... 320/109 |
| 6,856,116 | B1 | * | 2/2005 | Kirkpatrick | ................. 320/101 |

OTHER PUBLICATIONS

Cussons Technology, "Photovoltaic Solar Power Unit," no date.

* cited by examiner

*Primary Examiner*—Edward Tso
(74) *Attorney, Agent, or Firm*—F. Chau & Associates, LLC

(57) ABSTRACT

A rechargeable electronic device system including a charging device and a rechargeable electronic device. The charging device includes at least one laser source. The rechargeable electronic device is mounted in the charging device. The rechargeable device includes a rechargeable battery and at least one photovoltaic receptor. The at least one laser source is aligned with the at least one photovoltaic receptor such that the at least one laser source emits laser light to the at least one photovoltaic receptor. The at least one photovoltaic receptor converts laser light to energy used to recharge the rechargeable battery.

21 Claims, 3 Drawing Sheets

RECHARGEABLE ELECTRONIC DEVICE SYSTEM AND METHOD FOR RECHARGING AN ELECTRONIC DEVICE

BACKGROUND OF THE INVENTION

1. Field of the Invention

The present invention relates to rechargeable electronic devices, and more particularly to a method and apparatus for recharging batteries used to power a rechargeable electronic device, such as a wrist watch computer.

2. Description of the Related Art

Rechargeable electronic devices use rechargeable batteries, such as NiCd (nickel cadmium), NiMH (nickel-metal hydride) and lithiuim-based batteries. Conventionally, the rechargeable batteries are recharged by supplying current through wires that are connected to the electronic device. The electronic device may have external electrical contacts for receiving electrical energy from an external power supply to recharge the batteries. Such external electrical contacts may be prone to poor performance, or even failure, due to becoming dirty or corroded. Further, electrical contacts are undesirable for use with electronic devices that are exposed to water, because the electrical contacts make the electronic device difficult to water proof.

Alternatively, contact-less charging using induction has been used in electronic devices, such as motorized toothbrushes and cordless phones. According to this conventional method, an inductively rechargeable electronic device is placed in an inductive charger. The inductive charger includes a primary coil and the electronic device includes a secondary coil. Alternating current flows through the primary coil of the inductive charger, causing a varying magnetic field that is used by the secondary coil in the electronic device to generate energy. The energy generated by the secondary coil is then used to charge the battery in the electronic device.

Although inductive charging obviates the need for contacts, such a method is not practical for use with smaller electronic devices because such devices do not have enough space to fit a coil large enough to generate energy to charge a battery. Further, the coil may interfere with the ability of the electronic device to communicate using radio frequency.

SUMMARY OF THE INVENTION

An object of the present invention is to provide an apparatus and method for recharging a rechargeable battery within a small electronic device.

Another object of the present invention is to provide an apparatus and method for recharging a battery within an electronic device that eliminates the need for electrical contacts between the electronic device and a charging device.

Another object of the present invention is to provide an apparatus and method for recharging a battery within an electronic device that allows for the electronic device to be waterproof.

An exemplary embodiment of the rechargeable electronic device system of the invention includes a charging device and a rechargeable electronic device. The charging device includes a plurality of laser sources. The rechargeable electronic device is mounted in the charging device and includes a rechargeable battery and a plurality of photovoltaic receptors. The plurality of laser sources of the charging device is aligned with the plurality of photovoltaic receptors of the rechargeable electronic device such that the plurality of laser sources emits laser light to the plurality of photovoltaic receptors. The plurality of photovoltaic receptors convert the laser light to energy used to recharge the rechargeable battery.

According to an exemplary embodiment of the invention, the rechargeable electronic device is a wrist watch. The wrist watch can have photovoltaic receptors arranged on the bezel of the wrist watch.

An exemplary embodiment of the method for recharging a rechargeable electronic device of the invention includes aligning a plurality of laser sources arranged on a charging device with a plurality of receptors arranged on the rechargeable electronic device. Laser light is emitted from the plurality of laser sources on the charging device to the plurality of receptors. The laser light is converted into energy for recharging the rechargeable electronic device. The rechargeable electronic device is charged using the energy converted from the laser light.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DESCRIPTION OF PREFERRED EMBODIMENTS

The various exemplary embodiments of the systems and methods according to the present invention are described below with respect to recharging a rechargeable wrist watch, particularly an "intelligent" wrist watch that is capable of wirelessly accessing information from a network and other devices, as well as performing a variety of desktop PC-like functions. However, it should be appreciated that the systems and methods according to the various exemplary embodiments of the invention can be applied to recharging any battery powered device having a rechargeable battery, such as, for example, a pager, a cellular phone, or a digital camera.

Figure 1:
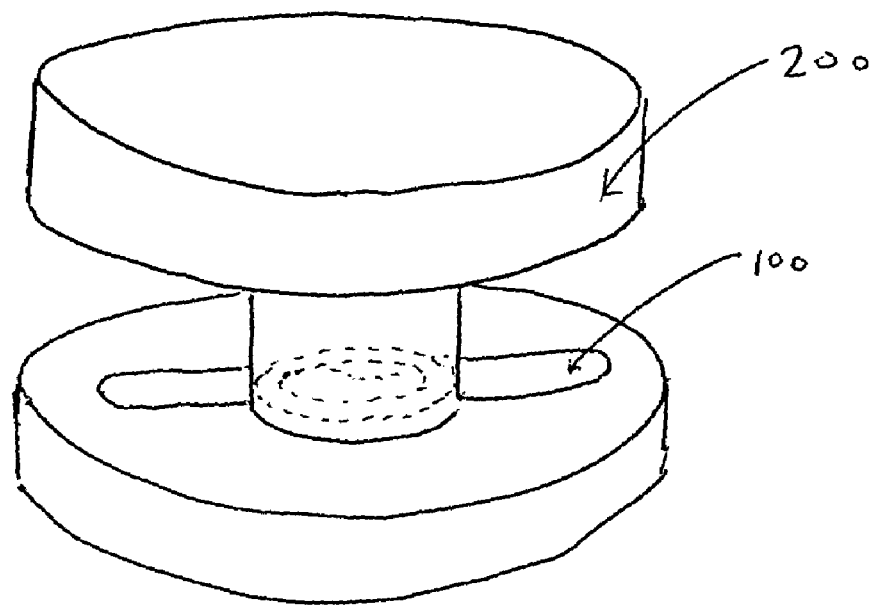
FIG. 1 shows an exemplary embodiment of the rechargeable wrist watch system according to the invention.

FIG. 1 shows one exemplary embodiment of the rechargeable wrist watch system 1 according to the invention. As shown in FIG. 1, the rechargeable wrist watch system 1 includes a rechargeable wrist watch 100 and a wrist watch charging device 200.

Figure 2:
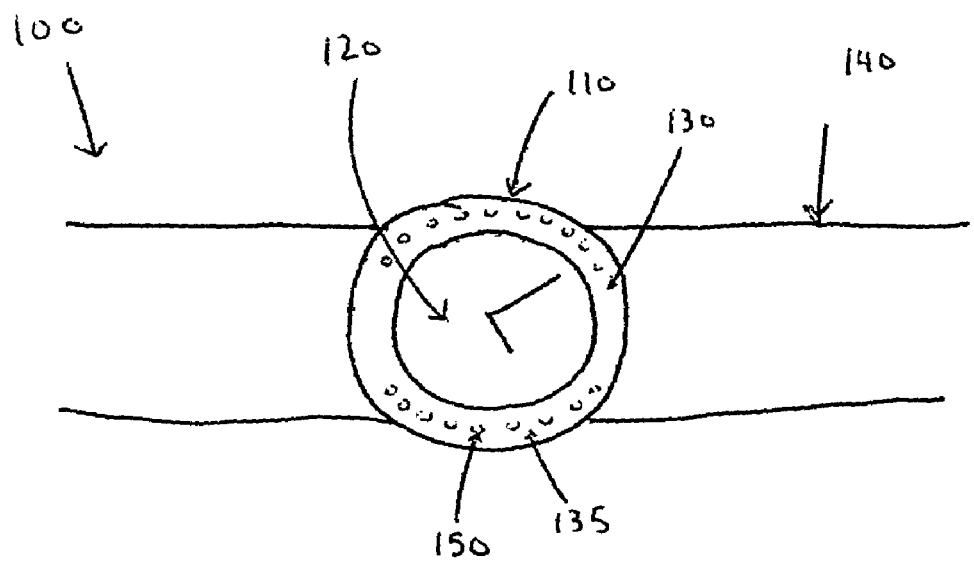
FIG. 2 shows an exemplary embodiment of the rechargeable wrist watch according to the invention.

FIG. 2 shows an exemplary embodiment of the rechargeable wrist watch 100 according to the invention. The wrist watch 100 includes a casing 110, a watch face 120, a bezel 130 and a wrist band 140. The bezel 130 surrounds the watch face 120. The casing 110 is attached to the watch band 140, which in turn can be used to strap the wrist watch 100 to the wrist of a user. A plurality of photovoltaic receptors 150 are disposed on the upper surface 135 of the bezel 130. As shown in FIG. 2, the photovoltaic receptors 150 are arranged in semicircular patterns around the bezel 130. However, it should be appreciated that, in other embodiments of the invention, the photovoltaic receptors 150 could be arranged in any other shaped pattern around the bezel 130.

Figure 3:
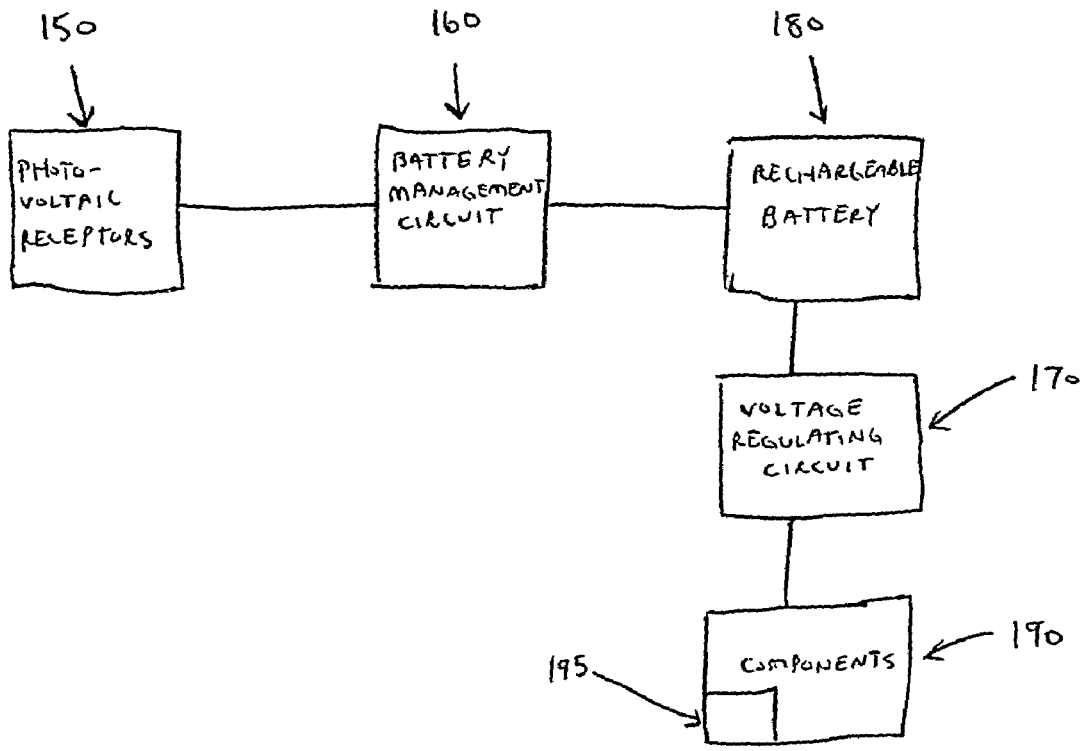
FIG. 3 is a block diagram illustrating the internal components of an exemplary embodiment of the wrist watch according to the invention.

FIG. 3 is a block diagram illustrating internal components of the wrist watch 100. As shown in FIG. 3, the wrist watch 100 includes the plurality of photovoltaic receptors 150, a battery management circuit 160, a DC to DC voltage regulating circuit 170, a rechargeable battery 180 and various electrical/electromechanical components 190 that allow the wrist watch 100 to function as a time-keeping device, access information from a network and/or other devices, and perform a variety of PC-like functions. For example, the components 190 could include a communication interface 195 having GPS (Global Positioning System) and mobile phone communication capability.

Although only one battery 180 is shown in FIG. 3, it should be appreciated that there may be more than one battery 180. The battery 180 can be any known rechargeable battery, such as, for example, a lithium based rechargeable battery, a NiCd rechargeable battery, or a NiMH rechargeable battery. The photovoltaic receptors 150 can be any suitable photovotaic receptors, such as GaAs (gallium arsenide) photovoltaic receptors.

The battery management circuit 160 can be any conventional battery management circuit that properly charges the battery 180 and protects the battery 180 from overcharging. For example, the battery management circuit can include any suitable voltage decreasing or voltage increasing circuitry, as needed, to match the voltage output of the photovoltaic receptors 150 to the charging voltage needed to recharge the battery 180.

The DC to DC voltage regulating circuit 170 can be any conventional voltage regulating circuit that provides a relatively constant output DC voltage to the wrist watch components despite the declining voltage input it receives from the rechargeable battery 180 over time.

Figure 4:
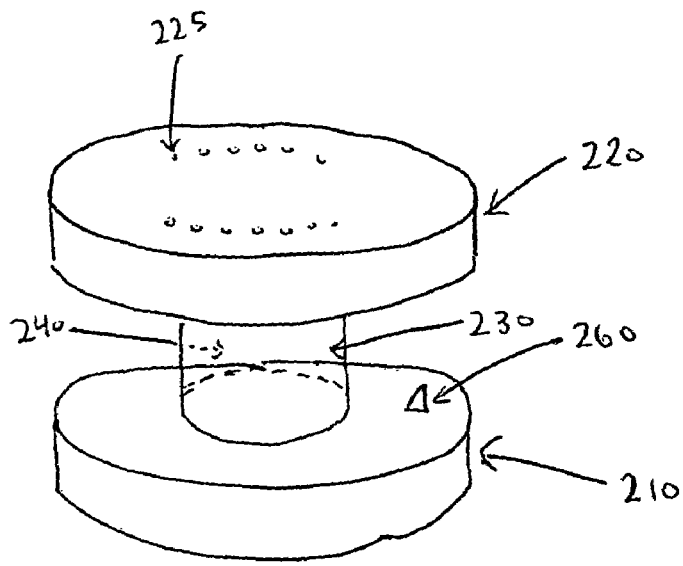
FIG. 4 shows an exemplary embodiment of the charging device according to the invention.

FIG. 4 shows an embodiment of the charging device 200. The charging device 200 includes a lower base 210, an upper base 220, and opaque shields 230 and 240. The opaque shields 230 and 240 connect the lower base 210 to the upper base 220. The upper base 220 includes a plurality of laser sources 225 arranged in semicircular patterns to correspond to the semicircular patterns of the photovoltaic receptors 150 arranged around the bezel of the wrist watch 100. It should be appreciated that, in other embodiments, the plurality of laser sources 225 can be arranged to correspond to any other pattern of the plurality of photovoltaic receptors 150. As explained more fully below, the wrist watch 100 can be placed on the lower base 210 of the charging device 200 so that the plurality of laser sources 225 of the upper base 210 align with the plurality of photovoltaic receptors 150 of the wrist watch 100.

The charging device 200 may be supplied with power for the laser sources 225 from any suitable external electrical power source. Alternatively, the charging device 200 may include at least one disposable or rechargeable battery located within the charging device 200.

The charging device 200 may also include a switch 260 for turning on and off the laser sources 225. The switch may be activated manually by a user. Alternatively, for better safety, the switch may be activated by the wrist watch 100 when the wrist watch 100 is placed on the lower base 210 of the charging device 200. Any suitable sensor/switch circuitry may be used for the switch 260, such as, for example, circuitry using a photointerrupter.

Figure 5:
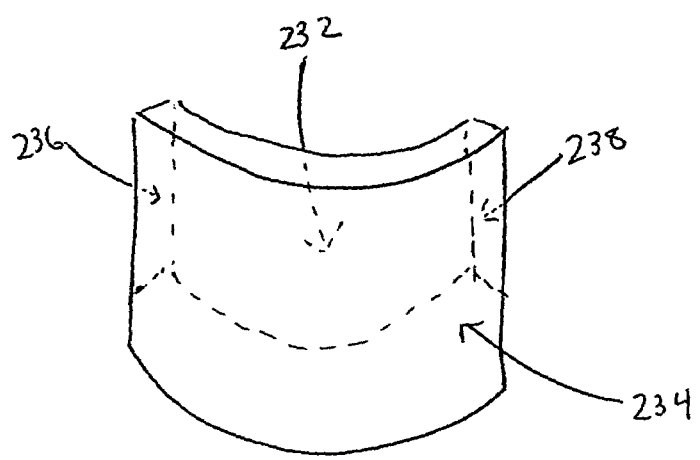
FIG. 5 shows an exemplary embodiment of the opaque shield useable with the various exemplary embodiments of the rechargeable electronic device system according to the invention.

FIG. 5 shows the opaque shield 230. The opaque shields 230 and 240 contain the laser light emitted from the laser sources. The opaque shields 230 and 240 can be made of any suitable opaque material, such as, for example, plastic. Opaque shield 230 is identical to opaque shield 240, so that further description of the opaque shield 240 is omitted. As shown in FIG. 5, the opaque shield 230 includes an inner wall 232, an outer wall 234, and side walls 236 and 238. The outer wall 234 forms a section of a circular shape having a diameter slightly larger than that of the bezel of the wrist watch 100. The inner wall 232 forms a section of a circular shape concentric with the section of the circular shape formed by the outer wall 234. The section of the circular shape formed by the inner wall 232 has a diameter slightly smaller than that of the bezel of the wrist watch 100. The inner wall 232 and the outer wall 234 are attached to one another by the side walls 236 and 238.

Figure 6:
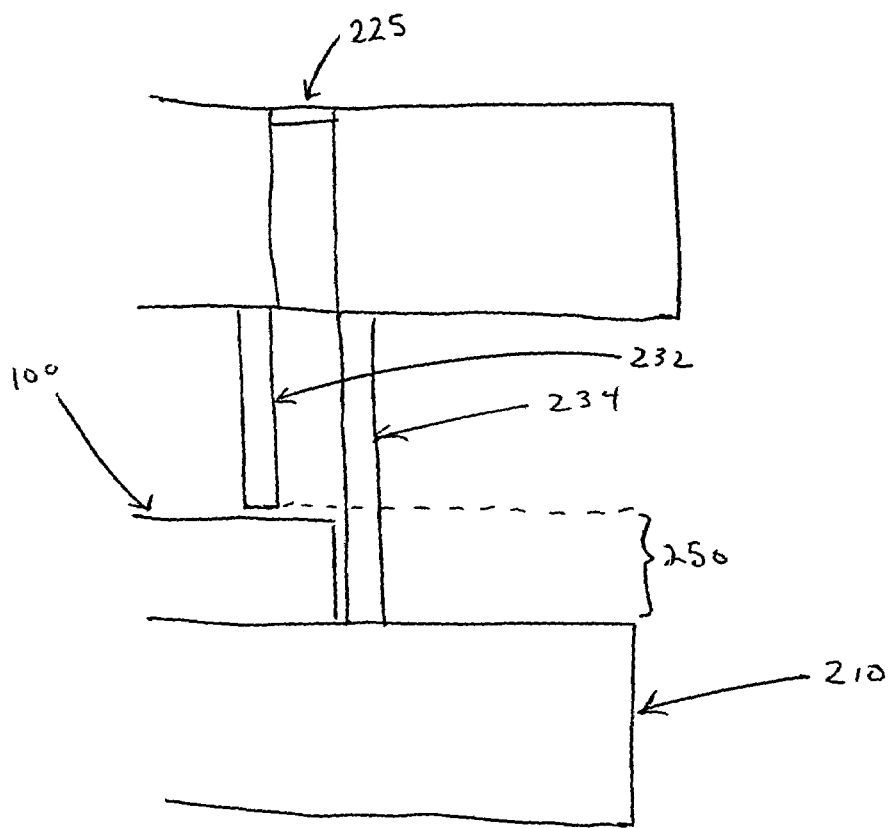
FIG. 6 is a cross sectional view of an exemplary embodiment of the charging device according to the invention.

FIG. 6 is a cross sectional view of the charging device 200. As shown in FIG. 6, the inner wall 232 does not contact the lower base 210, so that a gap 250 is formed between the inner wall 232 and the lower base 210. The plurality of laser sources 225 are arranged between the inner wall 232 and the outer wall 234, so that laser light emitted by the laser sources 225 is contained between the inner wall 232 and the outer wall 234. As illustrated in FIG. 6, the gap 250 is large enough so that the bezel 130 of the wrist watch 100 can be placed underneath the inner wall 232. There is just enough space between the opaque shields 230 and 240 to allow the wrist band 140 to lay flat on the lower base 210 when the watch casing 110 is placed between the opaque shields 230 and 240. Thus, the spacing of the opaque shields 230 and 240 automatically aligns the photovoltaic receptors 150 arranged on the bezel 130 of the wrist watch 100 with the laser sources 225 when the watch casing 110 is placed between the opaque shields 230 and 240.

The laser sources 225 can be any suitable laser sources, such as, for example, GaAs laser sources. However, from a safety perspective, the laser sources 225 should be low power, preferably operating at about 1 mW or less. The photovoltaic receptors 150 can be tuned to the precise wavelength of the laser light emitted by the laser sources 225. Thus, the photovoltaic receptors can be quite efficient, converting a large fraction of the incident laser light into energy to be used to charge the battery 180. For example, several hundred laser sources 225 can be used in conjunction with several hundred corresponding photovoltaic receptors 150 to recharge a battery in a few hours time.

In operating the rechargeable wrist watch system 1, a user places the wrist watch 100 into the charging device 200 so that the photovoltaic receptors 150 on the bezel 130 of the wrist watch 100 are aligned below the laser sources 225 of the upper base 220 of the charging device 200. The user then activates the switch 260, or alternatively the switch is automatically activated by the switch sensing the presence of the wrist watch 100 on the lower base 210. When activated, the laser sources 225 of the charging device 200 emit laser light down onto the photovoltaic receptors 150 of the wrist watch 100. The laser light is converted into energy by the photovoltaic receptors 150. The energy is then used to charge the battery 180 of the wrist watch 100.

In other embodiments of the invention, the laser sources 225 of the charging device 200 can be used to input data to the wrist watch 100. For example, the laser sources 225 can be controlled to modulate the laser light so as to download digital data to the wrist watch 100 through the photovoltaic receptors

150. The digital data can include information such as, for example, address and telephone entries, scheduling information, and budgeting details. In embodiments of the invention, the charging device 200 includes multiple laser sources 225. Thus, by modulating the laser sources 225, the charging device 200 is able to independently download to the wrist watch 100 a large amount of different types of digital information at once.

Although the illustrative embodiments have been described herein with reference to the accompanying drawings, it is to be understood that the present invention and method are not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A rechargeable electronic device system, comprising:
    a charging device, the charging device comprising an upper base, a lower base, at least one outer wall connecting the lower base to the upper base and at least one inner wall extending from the upper base towards the lower base, wherein the at least one inner wall does not contact to the lower base and wherein at least one laser source is disposed in the upper base; and
    a rechargeable electronic device mounted in the charging device, the rechargeable device comprising a rechargeable battery and at least one photovoltaic receptor, the at least one laser source for emitting light between the at least one outer wall and the at least one inner wall, wherein the at least one laser is aligned with the at least one photovoltaic receptor such that the at least one laser source emits laser light to the at least one photovoltaic receptor and the at least one photovoltaic receptor converts the laser light to energy used to recharge the rechargeable battery.

2. The rechargeable electronic device system of claim 1, wherein the rechargeable battery is at least one of a NiCd rechargeable battery, a NiMH rechargeable battery and a lithium-based rechargeable battery.

3. The rechargeable electronic device system of claim 1, wherein the at least one photovoltaic receptor is tuned to a wavelength of laser light emitted by the at least one laser source.

4. The rechargeable electronic device system of claim 1, wherein the rechargeable electronic device comprises a battery management circuit that regulates charging of the rechargeable battery.

5. The rechargeable electronic device system of claim 1, wherein the rechargeable electronic device comprises a DC to DC voltage regulating circuit that provides constant DC voltage to components of the rechargeable electronic device.

6. The rechargeable electronic device system of claim 1, wherein the rechargeable electronic device is a wrist watch.

7. The rechargeable electronic device system of claim 6, wherein the wrist watch comprises:
    a watch face; and
    a bezel disposed around the watch face, the at least one photovoltaic receptor being arranged on a top surface of the bezel.

8. The rechargeable electronic device system of claim 7, wherein the photovoltaic receptors are arranged in semicircular patterns on the top surface of the bezel.

9. The rechargeable electronic device system of claim 6, wherein the wrist watch includes a communication interface that communicates with other electronic devices.

10. The rechargeable electronic device system of claim 1, wherein the plurality of walls are opaque.

11. The rechargeable electronic device system of claim 1, wherein a gap is formed between the inner wall and the lower base of the charging device such that the rechargeable electronic device can be placed on the lower base between the inner wall and the outer wall.

12. The rechargeable electronic device system of claim 11, wherein the plurality of walls align the rechargeable electronic device in the charging device such that the at least one photovoltaic receptor of the rechargeable electronic device aligns with the at least one laser source of the charging device.

13. The rechargeable electronic device system of claim 1, wherein the charging device comprises a switch to activate the laser sources.

14. The rechargeable electronic device system of claim 13, wherein the switch automatically activates the at least one laser source when the electronic device is mounted in the charging device.

15. The rechargeable electronic device of claim 12, wherein the rechargeable electronic device is a wrist watch.

16. The rechargeable electronic device of claim 12, wherein the wrist watch comprises:
    a watch face;
    a bezel disposed around the watch face, the photovoltaic receptors being arranged on a top surface of the bezel.

17. The rechargeable electronic device of claim 16, wherein the photovoltaic receptors are arranged in semicircular patterns on the top of the bezel.

18. The rechargeable electronic device of claim 17, wherein the laser sources are arranged in semicircular patterns that correspond to the semicircular patterns of the photovoltaic receptors.

19. A charging device, comprising:
    a mounting device; and
    at least one laser source that emits laser light to a rechargeable electronic device mounted in the mounting device, wherein the mounting device comprises:
    a lower base;
    an upper base, wherein the at least one laser source is disposed on the upper base;
    at least one outer wall connecting the lower base to the upper base; and
    at least one inner wall extending from the upper based towards the lower base, wherein the at least one inner wall does not contact to the lower base.

20. The charging device of claim 19, wherein each of the plurality of walls comprise:
    a plurality of side walls that connect the inner wall to the outer wall.

21. The charging device of claim 19, wherein the at least one laser source is disposed on the upper base between the inner walls and the outer walls of the plurality of walls.

* * * * *